(12) United States Patent
Kino et al.

(10) Patent No.: US 7,344,777 B2
(45) Date of Patent: Mar. 18, 2008

(54) POWDER RUBBER SUBJECTED TO TREATMENT OF MAKING UNEVENNESS ON SURFACE THEREOF AND RUBBER COMPOSITION USING THE SAME AND TIRE

(75) Inventors: Kuniki Kino, Shinjuku-ku (JP); Kohtaro Kirimura, Shinjuku-ku (JP); Masahiro Hojo, Kodaira (JP); Yuichi Ishino, Musashimurayama (JP)

(73) Assignee: Bridgestone Corporation, Tokyo (JP)

( * ) Notice: Subject to any disclaimer, the term of this patent is extended or adjusted under 35 U.S.C. 154(b) by 179 days.

(21) Appl. No.: 10/497,476

(22) PCT Filed: Nov. 28, 2002

(86) PCT No.: PCT/JP02/12452

§ 371 (c)(1),
(2), (4) Date: Jun. 1, 2004

(87) PCT Pub. No.: WO03/048236

PCT Pub. Date: Jun. 12, 2003

(65) Prior Publication Data

US 2005/0037199 A1   Feb. 17, 2005

(30) Foreign Application Priority Data

Dec. 4, 2001   (JP) ............................. 2001-370373

(51) Int. Cl.
*B32B 5/66* (2006.01)
(52) U.S. Cl. ..................................... 428/402; 428/403
(58) Field of Classification Search ................ 428/402, 428/403
See application file for complete search history.

(56) References Cited

U.S. PATENT DOCUMENTS 3,907,726 A    9/1975  Tomiyama 5,275,948 A *  1/1994  Straube et al. .............. 435/262
5,597,851 A *  1/1997  Romine et al. .............. 521/41

FOREIGN PATENT DOCUMENTS

| JP | 53-54245 A | 5/1978 |
|---|---|---|
| JP | 55-108431 A | 8/1980 |
| JP | 09-194624 A | 7/1997 |
| JP | 9-296057 A | 11/1997 |
| JP | 10-87858 A | 4/1998 |
| JP | 11-060793 A | 3/1999 |
| JP | 2002-146031 A | 5/2002 |
| WO | WO 01/74933 A2 | 10/2001 |

OTHER PUBLICATIONS

Patent Abstracts of Japan, vol. 0030, No. 79 (C-051), Jul. 6, 1979.

* cited by examiner

Primary Examiner—Leszek Kiliman
(74) Attorney, Agent, or Firm—Sughrue Mion, PLLC

(57) ABSTRACT

A powder rubber obtained by crushing a waste rubber comprising various kinds of rubbers is subjected to treatment of making unevenness on a surface thereof. A method in which a microorganism growing with a rubber being an only carbon source and powder rubber having an average particle diameter of 1 mm or less are added to a culture medium to cultivate the microorganism can be applied as treatment of making the unevenness. The powder rubber is decomposed by this method, and the surface area is increased, whereby a rubber composition which is excellent in abrasion resistance, fracture characteristics and crack growth resistance can be obtained. A WU-YS05 strain (Patent Microorganism Depository Center: Accession number: FERM P-18660) belonging to Pseudonocardiaceae is effective as the microorganism.

13 Claims, No Drawings

POWDER RUBBER SUBJECTED TO TREATMENT OF MAKING UNEVENNESS ON SURFACE THEREOF AND RUBBER COMPOSITION USING THE SAME AND TIRE

TECHNICAL FIELD

The present invention relates to powder rubber for obtaining a rubber composition maintaining good fracture characteristics and high abrasion resistance while using powder rubber and a rubber composition blended with the same.

BACKGROUND ART

Waste tires have a high recovery rate as compared with those of general plastic products and are reused as a fuel mainly in cement mills. In recent years, however, use of tire rubber pieces or rubber powder as they are, that is, a rise in a so-called material recycling rate is desired, and a crush desulfurization method in which large shearing force is applied by means of a double screw extruder, a pulverization method and various desulfurization methods for crushed vulcanized rubbers are investigated as methods for reusing waste rubbers of waste tires, etc., but a problem that the energy costs grow high is involved therein.

Then, treatment by microorganisms is investigated as an energy saving method. Microbial treatment is carried out at a low temperature, and therefore it is a treatment method consuming least energy. In respect to the microbial treatment, a method by which hard rubber is efficiently subjected to decomposition treatment is proposed in Japanese Patent Application Laid-Open No. 194624/1997 and Japanese Patent Application Laid-Open No. 60793/1999. However, treatment methods intending to completely decompose rubber pieces are shown in both the patent applications, and nothing is described on how powder rubber effective for material recycling can be obtained.

An object of the present invention is to obtain powder rubber for obtaining a rubber composition which maintains better fracture characteristics and higher abrasion resistance as compared with a case where conventional powder rubber is used and which is obtained from a waste rubber by less energy, and a rubber composition blended with the same.

DISCLOSURE OF THE INVENTION

Intensive research repeated by the present inventors has resulted in finding that powder rubber having a specific size which is obtained by crushing a waste rubber by a conventional method is subjected to surface treatment for further increasing unevenness on a surface thereof to thereby provide a rubber composition prepared using the above powder rubber with good fracture characteristics and that a decomposition method by microorganisms is particularly effective, though not restricted, as a method for increasing the above unevenness, and thus the invention has come to be completed.

That is, the present invention comprises the following items (1) to (9).
(1) Powder rubber subjected to treatment of making unevenness on a surface thereof.
(2) The powder rubber as described in the above item (1), wherein the treatment of making unevenness is carried out using a microorganism.
(3) The powder rubber as described in the above item (2), wherein the microorganism is a microorganism belonging to Pseudonocardiaceae.
(4) The powder rubber as described in the above item (3), wherein the microorganism belonging to Pseudonocardiaceae is a WU-YS05 strain having an accession number of FERM P-18660.
(5) The powder rubber as described in any of the above items (1) to (4), wherein the powder rubber before subjected to the treatment of making unevenness has an average particle diameter of 1 mm or less.
(6) The powder rubber as described in the above item (5), wherein the powder rubber before subjected to the treatment of making unevenness has an average particle diameter of 0.2 mm or less.
(7) The powder rubber as described in any of the above items (1) to (6), wherein the treatment of making unevenness carried out such that a weight change rate of the powder rubber falls in a range of 0.01 to 40% between before and after subjected to the treatment.
(8) A rubber composition using the powder rubber as described in any of the above items (1) to (7).
(9) A tire characterized by using the rubber composition as described in the above item (8).

The kind of a waste rubber which is a raw material for the powder rubber used in the present invention shall not specifically be restricted. The microorganism used for the microbial treatment can be separated from soil by screening.

BEST MODE FOR CARRYING OUT THE INVENTION

The embodiment of the present invention shall specifically be explained below.

The kind of a waste rubber which is a raw material for the powder rubber used in the present invention shall not specifically be restricted, and a waste rubber comprising at least one selected from natural rubber and synthetic rubbers can be used. Capable of being exemplified as the synthetic rubbers are preferably diene base rubbers, for example, 1,4-cis-polyisoprene, styrene.butadiene copolymers, low 1,4-cis-polybutadiene, high 1,4-cis-polybutadiene, ethylene.propylene. diene copolymers, chloroprene rubber, halogenated butyl rubber and acrylonitrile-butadiene. rubber.

A vulcanized rubber which is a raw material for the powder rubber is blended with a silane coupling agent, sulfur, a vulcanizing agent, a vulcanization-accelerator, a vulcanization-accelerator activation, an antioxidant, an antiozonant, an age resister, a process oil, zinc oxide (ZnO), stearic acid and a peroxide which are usually used in the rubber industry.

In the present invention, capable of being used are not only powder rubber obtained by crushing waste tires and tubes by a conventional method but also powder rubber obtained by crushing non-vulcanized scraps generated in producing tires and spew pieces generated in vulcanizing tires.

In the present invention, a surface area of the powder rubber can be increased without substantially changing the particle diameter by subjecting the surface thereof to treatment of making unevenness, and use of such powder rubber can provide a rubber composition having good fracture characteristics.

A method for carrying out the treatment of making unevenness on the surface in the present invention shall not specifically be restricted, and to be specific, a method using microorganisms, oxidative decomposition, ozone treatment and plasma treatment can be given. Among them, the method using microorganisms is effective.

The microorganisms used in the present invention shall not specifically be restricted, and bacteria, actinomycetes, fungi and white rot fungi are preferred.

In the bacteria, it is known that natural rubber is decomposed by *Xantomonas* sp., *Pseudomonas citronellolis* and *Pseudomonas aeruginosa*. In the actinomycetes, it is known that natural rubber is decomposed by a lot of actinomycetes such as *Nocardia* sp., *Nocardia asteroides*, *Nocardia blasiliensis*, *Gordona* sp., *Gordona polyisoprenivorans*, *Micromonospora aurantiaca*, *Micromonospora fortuitum*, *Sreptomyces coelicolor*, *Actinomyces elastica*, *Actinomyces fluscus*, *Proactinomyces ruber*, *Actinomadura libanotica*, *Actinoplanes missouriensi*, *Actinoplanes italicus*, *Actinoplanes utahensis*, *Dactylosporangium*, *thailandense*, *Micromonospora* sp., *Streptomyces* sp., *Streptomyces acrimycini*, *Streptomyces albogriseu*, *Streptomyces albadunctus*, *Streptomyces antibioticus*, *Streptomyces atroolivaceus*, *Streptomyces aureocirculatus*, *Streptomyces daghestanicus*, *Streptomyces flavoviridi*, *Streptomyces fradiae*, *Streptomyces griseus*, *Streptomyces griseobrunneus*, *Streptomyces griseoflavus*, *Streptomyces griseoviridis*, *Streptomyces nitrosporeus*, *Streptomyces olivaceus*, *Streptomyces olivoviridis*, *Streptomyces tauricus* and *Amycolatopsis* sp. The present inventors have found that among them, microorganisms belonging to *Pseudonocardiaceae*, especially a WU-YS05 strain have a high decomposing ability for natural rubber.

The WU-YS05 strain is deposited as:
Independent Administrative Institution;
National Institute of Advanced Industrial Science and Technology, Patent Microorganism Depository Center:
Accession number: FERM P-18660
Deposit date: Dec. 21, 2001

Further, in the fungi (mold), it is known that natural rubber is decomposed by *Aspergillus* sp., *Stemphylium macrosporoideum*, *Paecilomysces lilacinus*, *Phoma eupyrena*, *Fusarium solani* and *Cladosporium cladosporioide*, and in recent years, it is reported that natural rubber and synthetic rubbers such as SBR are decomposed by white rot fungi, especially Ceriporiosis subvermispora.

In the present invention, these microorganisms can be used alone or in combination of a plurality thereof. These microorganisms can grow using fundamentally a rubber as an only carbon source, and arrangement of such environment that they can grow using a rubber as a carbon source makes it possible to screen and isolate them from soil. For example, a liquid culture medium shown in Table 1 is given as the example thereof in the case of the actinomycetes.

TABLE 1

| | |
|---|---|
| $K_2HPO_4$ | 8.0 g |
| $KH_2PO_4$ | 1.0 g |
| $MgSO_4 \cdot 7H_2O$ | 0.2 g |
| NaCl | 0.1 g |
| $(NH_4)_2SO_4$ | 0.5 g |
| $Ca(NO_3)_2$ | 0.1 g |
| Metal solution | 10 ml |
| Vitamin solution | 1 ml |
| Deionized water | 1000 ml |
| pH | 7.5 |

The above culture medium does not have a carbon source, and therefore the natural rubber-decomposing fungi described above can be grown by adding a natural rubber sheet to the medium. This can be a seed fungus for microbial treatment.

A manner for carrying out the microbial treatment of the powder rubber in the present invention shall not specifically be restricted. For example, powder rubber is added to the culture medium described above, and when a fungus such as a microorganism belonging to Pseudonocardiaceae obtained as a seed fungus is inoculated, the rubber-decomposing microorganism begins to proliferate using the powder rubber as an only carbon source and decomposes the surface of the powder rubber to form irregularities on the surface of the powder rubber.

The cultivation conditions of the microorganism can be the cultivation conditions for conventional aerobic microorganisms, and amounts of the fungus and the powder rubber are one platinum loop and 1 g to 5 g per 1000 ml to 100 ml of a liquid culture medium respectively; the cultivation temperature is room temperature (25 to 35° C.); and the cultivation time is, though depending on the level of the unevenness, 5 to 20 days.

The powder rubber before subjected to the treatment of making unevenness has a particle diameter of preferably 1 mm or less, more preferably 0.5 mm or less, further preferably 0.2 mm or less and particularly preferably 0.1 mm or less. Even if the particle diameter is further larger, the desired effect can be obtained by providing the surface with unevenness, but reduction in advance in the particle diameter to some extent makes it possible to efficiently obtain the powder rubber having a large surface area.

The degree of the unevenness shall not specifically be restricted and is suitably selected according to the purposes and the uses. The degree of the unevenness can be judged by a weight change rate of the powder rubber, and a weight change rate of the powder rubber falls preferably in a range of 0.01 to 40%.

After cultivating, the powder rubber is filtered, washed with an organic solvent and water, dried and then used as a raw material for a rubber composition.

Blending of the powder rubber subjected to the surface treatment according to the present invention makes it possible to obtain a rubber composition which is better in fracture characteristics and abrasion resistance than those prepared by using conventional powder rubber. Use of such rubber composition for a tire tread, a side wall and coating rubber for a carcass ply and a belt ply makes it possible to improve the durability as compared with tires prepared by using conventional powder rubber. Not only air but also inert gas such as nitrogen can be used as gas charged into the tire according to the present invention.

EXAMPLES

The present invention shall be explained below with reference to examples and comparative examples, but the present invention shall by no means be restricted to the following examples.

1. Screening of Microorganism

About 10 mg of soil and rubber pieces obtained by cutting a natural rubber latex glove subjected to acetone extraction treatment into 5 cm square were put into 100 ml of the culture medium shown in Table 1, and they were cultivated by shake culture at 30° C. for 2 weeks. Fungi stuck on the surfaces of the rubber pieces were separated on a solid culture medium which contains 1.5% by weight of agar in a solution having the same composition as that of the culture medium shown in Table 1 to obtain a WU-YS05 strain (microorganism of Pseudonocardiaceae).

2. Surface Treatment of Making Unevenness

A commercial powder rubber (200 mesh: manufactured by Rouse Co., Ltd. in U.S.A.) of 5 g/l was put into the culture medium having the composition shown in Table 1 charged into a glass bottle equipped with a silicone stopper, and it was subjected to sterilization treatment at 90° C. in an autoclave, followed by aseptically inoculating the WU-YS05 strain by means of a platinum loop. It was cultivated by shake culture at 30° C. for 10 days under the condition of 50 to 70 rpm, and then the powder rubber was filtered through a filter paper. The powder rubber on the filter paper was washed several times with acetone, then washed with pure water and dried at 40° C. under vacuum to obtain a sample of the powder rubber for blending.

Further, the same treatment to powder rubber was carried out for comparison, except that the microbial strain was not inoculated at all.

A weight reduction rate (decomposition rate) of the inoculated powder rubber between before and after the treatment was 0.8% in comparison with less than 0.1% of the non-inoculated powder rubber, and therefore it was confirmed that the powder rubber was decomposed by the microorganism.

3. Surface Observation

The surface of the powder rubber after dried was observed under a scanning electron microscope (SEM) manufactured by JEOL Ltd. to confirm that the powder rubber treated with inoculating the Pseudonocardiaceae WU-YS05 strain was apparently corroded on the surface thereof so that the unevenness became finer as compared with the powder rubber treated without inoculating it.

4. Evaluation of Recycled Rubber

The powder rubber obtained with inoculating the fungus as described above or the powder rubber obtained without inoculating the fungus and rubber compounding ingredients were added to a virgin rubber component and kneaded by means of a 80 ml plastomill to obtain a rubber composition for a tread and a side wall. This was pressed at 150° C. for 20 minutes to obtain a vulcanized rubber sample.

This composition was measured for abrasion resistance, fracture characteristics and crack growth resistance to evaluate the recycled rubber (surface-treated rubber).

1) Preparation of Rubber Composition

In the case of the rubber composition for a tread, compounding ingredients and the powder rubber were blended with the rubber component of 70 parts by weight of SBR and 30 parts by weight of BR both of which were virgin rubber in a blending proportion shown in Table 2 to obtain rubber compositions, and in the case of the rubber composition for a side wall, compounding ingredients and the powder rubber were blended with the rubber component of 50 parts by weight of natural rubber and 50 parts by weight of BR both of which were virgin rubber in a blending proportion shown in Table 3 to obtain rubber compositions.

The use amounts of the powder rubber in the respective examples and comparative examples are shown in Table 4 and Table 5.

TABLE 2

| Tread blend | | |
|---|---|---|
| Rubber component | SBR | 70 |
|  | BR | 30 |
| Powder rubber |  | variable |
| Zinc oxide |  | 3 |
| Stearic acid |  | 2 |
| Carbon black |  | 85 |
| Aroma oil |  | 36.25 |
| Antioxidant |  | 1 |
| Vulcanization accelerator |  | 1.2 |
| Sulfur |  | 1.5 |

The amount of the aroma oil is the sum of an extender oil contained in the rubber component and a blend oil added in kneading.

Zinc oxide: #3

Carbon black: N330

Aroma oil: JSR AROMA

Antioxidant: Nocrac 3C (IPPD) (brand name, manufactured by Ohuchishinko Chemical Industrial Co., Ltd.)

Vulcanization accelerator: Nocceler NOB (OBS) (brand name, manufactured by Ohuchishinko chemical Industrial Co., Ltd.)

SBR: SBR #1712 (brand name, manufactured by JSR Corporation)

TABLE 3

| Side wall blend 1 | | |
|---|---|---|
| Rubber component | NR | 50 |
|  | BR | 50 |
| Powder rubber |  | variable |
| Carbon black |  | 50 |
| Softening agent |  | 30 |
| Zinc oxide |  | 2 |
| Stearic acid |  | 1 |
| Antioxidant |  | 2 |
| Wax |  | 3 |
| Vulcanization accelerator |  | 0.6 |
| Sulfur |  | 1 |

NR: RSS #3

BR: BR 01 (brand name, manufactured by JSR Corporation Ltd.)

Carbon black: FEF

Softening agent: aroma oil

Antioxidant: Nocrac 6C (brand name, manufactured by Ohuchishinko Chemical Industrial Co., Ltd.)

Wax: Suntight S (manufactured by Seiko Chemical Industries Co., Ltd.)

Accelerator: Nocceler NS-F (brand name, manufactured by Ohuchishinko Chemical Industrial Co., Ltd.)

2) Measuring Methods

The compositions described above were measured for abrasion resistance, fracture characteristics and crack growth resistance by the following methods to evaluate the recycled rubber.

In the evaluation, the respective characteristics were shown by indices, wherein the values in Comparative Example 1 (using no powder rubber and only virgin rubber) were set at 100 in the case of the rubber composition for a tread, and the values in Comparative Example 6 (an example using no powder rubber) were set at 100 in the case of the rubber composition for a side wall. The larger the index is, the better the characteristic is. The results thus obtained are shown in Tables 4 and 5.

Fracture Characteristics

The fracture strength (TB) was measured according to JIS K6301-1995 and shown by an index, wherein the value of the control was set at 100. The larger the numerical value is, the better the fracture characteristic is.

Crack Growth Resistance

The test was carried out in the same manner as in JIS K6301-1995, and a flexing frequency counted until a length of cracks reached 10 mm was measured and shown by an index, wherein the value of the control was set at 100. The larger the numerical value is, the better the crack growth resistance is.

Abrasion Resistance

Measured by a Lambourn abrading method. The measuring conditions were an applied load of 4.5 kg, a surface speed of a grinding stone of 100 m/second, a test speed of 130 m/second, a slip rate of 30%, a sand falling amount of 20 g/minute and a measuring temperature of room temperature. The results were shown by an index, wherein the value of the control was set at 100. The larger the numerical value is, the better the abrasion resistance is.

TABLE 4

|  | Comparative Example | | | | | Example | | |
| --- | --- | --- | --- | --- | --- | --- | --- | --- |
|  | 1 | 2 | 3 | 4 | 5 | 1 | 2 | 3 |
| Powder rubber*1 | 15 | | | | | | | |
| Powder rubber treated without microorganism | | 5 | 10 | 15 | | | | |
| Powder rubber treated with microorganism | | | | | | 5 | 10 | 15 |
| Fracture characteristic (TB) | 100 | 83 | 95 | 88 | 82 | 99 | 98 | 95 |
| Abrasion resistance | 100 | 84 | 94 | 91 | 85 | 101 | 98 | 96 |

Powder rubber*1: 80 mesh powder rubber manufactured by Rouse Co., Ltd. in U.S.A.

TABLE 5

|  | Comparative Example | | | | | Example | | |
| --- | --- | --- | --- | --- | --- | --- | --- | --- |
|  | 6 | 7 | 8 | 9 | 10 | 4 | 5 | 6 |
| Powder rubber*1 | 15 | | | | | | | |
| Powder rubber treated without microorganism | | 5 | 10 | 15 | | | | |
| Powder rubber treated with microorganism | | | | | | 5 | 10 | 15 |
| Fracture characteristic (TB) | 100 | 83 | 95 | 88 | 82 | 99 | 98 | 95 |
| Crack growth resistance | 100 | 42 | 72 | 58 | 38 | 83 | 68 | 52 |

Powder rubber*1: 80 mesh powder rubber manufactured by Rouse Co., Ltd. in U.S.A.

INDUSTRIAL APPLICABILITY

The rubber composition prepared by using the powder rubber subjected to the treatment of the present invention has good fracture characteristics, high abrasion resistance and crack growth resistance as compared with a rubber composition prepared by using a conventional powder rubber, and it can suitably be applied to a tire tread, a side wall, a carcass ply and a belt ply.

The invention claimed is:

1. A rubber powder having an uneven surface produced by the process of subjecting a rubber powder to a treatment with microorganisms belonging to Pseudonocardiaceae.

2. The rubber powder described in claim 1, wherein the microorganism belonging to Pseudonocardiaceae is a WU-YS05 strain having an accession number of FERM P-18660.

3. The rubber powder described in claim 1, wherein the powder rubber before subjected to the treatment of making unevenness has an average particle diameter of 1 mm or less.

4. The rubber powder described in claim 1, wherein the powder rubber before subjected to the treatment of making unevenness has an average particle diameter of 0.2 mm or less.

5. The rubber powder described in claim 1, wherein the treatment of making unevenness is carried out such that a weight change rate of the powder rubber falls in a range of 0.01 to 40% between before and after subjected to the treatment.

6. The rubber powder described in claim 3, wherein the treatment of making unevenness is carried out such that a weight change rate of the powder rubber falls in a range of 0.01 to 40% between before and after subjected to the treatment.

7. The rubber powder described in claim 2, wherein the treatment of making unevenness is carried out such that a weight change rate of the powder rubber falls in a range of 0.01 to 40% between before and after subjected to the treatment.

8. A rubber composition comprising the powder rubber as described in claim 1.

9. A rubber composition comprising the powder rubber as described in claim 1.

10. A tire comprising the rubber composition as described in claim 8.

11. A tire comprising the rubber composition as described in claim 9.

12. The rubber powder described in claim 1, wherein the powder rubber before subjected to the treatment of making unevenness has an average particle diameter of 0.5 mm or less.

13. The rubber powder described in claim 1, wherein the powder rubber before subjected to the treatment of making unevenness has an average particle diameter of 0.1 mm or less.

* * * * *